(12) United States Patent
Nagata

(10) Patent No.: US 9,658,905 B2
(45) Date of Patent: May 23, 2017

(54) INFORMATION PROCESSING APPARATUS AND METHOD FOR CARRYING OUT MULTI-THREAD PROCESSING

(75) Inventor: Akihito Nagata, Kanagawa (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 680 days.

(21) Appl. No.: 13/611,561

(22) Filed: Sep. 12, 2012

(65) Prior Publication Data

US 2013/0014114 A1    Jan. 10, 2013

Related U.S. Application Data

(63) Continuation of application No. PCT/JP2011/001715, filed on Mar. 23, 2011.

(30) Foreign Application Priority Data

May 24, 2010 (JP) .................... 2010-118718
May 24, 2010 (JP) .................... 2010-118719

(51) Int. Cl.
*G06F 9/46* (2006.01)
*G06F 9/54* (2006.01)
*G06F 9/52* (2006.01)

(52) U.S. Cl.
CPC ............ *G06F 9/546* (2013.01); *G06F 9/52* (2013.01); *G06F 2209/548* (2013.01)

(58) Field of Classification Search
None
See application file for complete search history.

(56) References Cited

U.S. PATENT DOCUMENTS 4,604,694 A    8/1986 Hough
5,442,763 A    8/1995 Bartfai
(Continued)

FOREIGN PATENT DOCUMENTS

CN    1859325 A    11/2006
CN    101127685 A    2/2008
(Continued)

OTHER PUBLICATIONS

Damian Dechev, "Scalable Nonblocking Concurrent Objects for Mission Critical Code" 2009, ACM New York, NY, (See section 2.1 "The Descriptor Object" and 2.4 "Descriptor-based Shared Vector" regarding interrupting threads completion operations of an interrupted thread during a CAS operations.).*

(Continued)

*Primary Examiner* — Lewis A Bullock, Jr.
*Assistant Examiner* — Wynuel Aquino
(74) *Attorney, Agent, or Firm* — Matthew B. Dernier, Esq.

(57) ABSTRACT

For a thread where data is to be popped off of queue storage, whether or not there is data that can be popped out of the queue storage accessed is first checked and then the data, if any, is popped. When there is no such data, the thread pushes thread information, including the identification information of its own thread, on the same queue and then releases a processor and shifts to a standby state. For a thread that is to push the data, when there is the thread information in the queue, it is determined that there is a thread waiting for the data, and then the data is sent after the thread information has been popped, which in turn resumes the processing.

17 Claims, 12 Drawing Sheets

(56) References Cited

U.S. PATENT DOCUMENTS

| | | | |
|---|---|---|---|
| 7,802,032 B2 | 9/2010 | Christenson | |
| 2006/0200829 A1* | 9/2006 | Astl | G06F 9/546 |
| | | | 719/314 |
| 2007/0124728 A1* | 5/2007 | Rosenbluth et al. | 718/100 |
| 2007/0157200 A1* | 7/2007 | Hopkins | 718/100 |
| 2008/0112423 A1 | 5/2008 | Christenson | |
| 2010/0083273 A1 | 4/2010 | Sihn | |

FOREIGN PATENT DOCUMENTS

| | | |
|---|---|---|
| CN | 101183304 A | 5/2008 |
| CN | 101685409 A | 3/2010 |
| JP | 60128537 A | 7/1985 |
| JP | 2125339 A | 5/1990 |
| JP | 3065732 A | 3/1991 |
| JP | 7191944 A | 7/1995 |
| JP | 2000022724 A | 1/2000 |
| JP | 2001084235 A | 3/2001 |
| JP | 2001346181 A | 12/2001 |
| JP | 2008123516 A | 5/2008 |

OTHER PUBLICATIONS

Damian Dechev, "Scalable Nonblocking Concurrent Objects for Mission Critical Code", 2009, ACM.*

Office Action for corresponding Chinese Patent Application 201180025454.9, dated Feb. 2, 2015.

Jinzhong Li, et al., Deep Study of the Co-current Problem of the Producer/Consumer, Computer Programming Technique and Maintenance•• ,Period 1, 3 pages, Jan. 3, 2008. (for relevancy, see Chinese OA for Patent Application 201180025454.9, dated Feb. 2, 2015 cited above).

Mit Takeshi, et al., An Implementation of Co-scheduling Concurrent Processes with an Adaptive Lock, IPSJ SIG Notes••, vol. 91, period 107 Section 3.3, fig 2, 8 pages, Dec. 6, 1991.(for relevancy, see Chinese OA for Patent Application 201180025454.9, dated Feb. 2, 2015 cited above).

Office Action for corresponding Japanese Patent Application 2010-118718, dated Nov. 12, 2013.

International Preliminary Report on Patentability for corresponding PCT Application PCT/JP2011/001715 , dated Dec. 10, 2012.

International Search Report for corresponding PCT Application PCT/JP2011/001715 , dated Jun. 14, 2011.

Takashi Hattori, Java no Arukikata dai 5 Kai Thread Programming no Chosen Suru, Java Press vol. 21, pp. 126-135 Dec. 1, 2001 (see International Search report for relevancy).

Takshi Miei, Naohisa Takahashi, AnImplementation of Co-scheduling Concurrent Processes with an Adaptive Lock, IPSJ SIG Notes, vol. 91, No. 107, pp. 1-8, Dec. 6, 1991.

Office Action for corresponding Chinese Patent Application 201180025454.9, pp. 1-12, dated Sep. 28, 2015.

* cited by examiner

28

INFORMATION PROCESSING APPARATUS AND METHOD FOR CARRYING OUT MULTI-THREAD PROCESSING

BACKGROUND OF THE INVENTION

1. Field of the Invention

The present invention relates to an information processing technology, and more particularly to an information processing apparatus and a method for carrying out the multi-thread processing.

2. Description of the Related Art

Information processing apparatuses available in the recent years include a multi-thread technology. In the multi-thread technology, not only a multitask environment where a plurality of processes can be simultaneously executed is achieved but also a parallel processing can be done in manner such that each process generates a plurality of threads inside the process. Each process is assigned its own unique resource and address space in the execution of the process, so that the process cannot access areas allocated to the other processes. In contrast to this, a thread is an executable unit or run unit that is generated within a process and therefore each thread can freely access each other's area inside the process. The thread is a basic processing unit to which an operating system allocates the execution time of CPU (central Processing Unit).

In such an environment where multiple threads are processed in parallel, an exclusive control can be achieved while the independency of the processor and the thread is maintained by providing queue storage in a shared memory and generating a waiting queue of threads requesting data and/or resource to be consumed.

Generally, when a certain thread is to retrieve data from the queue storage and when there is no data in the queue storage, the thread will be in a busy-wait state until new data is stored by another thread. While waiting, the CPU resource is wasted and this is problematic in that the processing efficiency as a whole drops as the frequency of occurrence of such a busy-wait state increases.

In the above-described technology, the thread must first be placed in the waiting queue by operating the queue storage when the thread requires access to data or resource. However, in order to ensure the consistency of data of waiting queue stored in the queue storage, a control mechanism needs to be employed in operating the queue storage itself. Accordingly, many procedures are required before the thread can finally access the data or resource.

SUMMARY OF THE INVENTION

The present invention has been made in view of the aforementioned problems, and a purpose thereof is to provide an information processing technology capable of preventing the processing efficiency from dropping which is caused by a thread's access to a queue. Another purpose thereof is to provide an information processing technology capable of improving the processing efficiency of access to the data and resource by the threads.

An embodiment of the present invention relates to an information processing apparatus. The information processing apparatus includes: a memory configured to store a data queue comprised of individual data; and at least one processor configured to process either of a data generation thread for placing data generated into the data queue or a data consumption thread for retrieving the data from the data queue, wherein, when there is no data to be retrieved in the data queue during processing of the data consumption thread, the processor placed identification information of the data consumption thread into the data queue, and wherein, when the data is to be placed into the data queue during processing of the data generation thread and when the identification information of the data consumption thread has been placed into the data queue, the processor changes a storage location of the data in such a manner that the data consumption thread is acquired.

Another embodiment of the present invention relates to an information processing method. The information processing method includes: placing the identification information of a first thread into a queue, when data is attempted to be retrieved from the queue stored in a memory during processing of a first thread performed by a processor but there is no data to be retrieved; and sending the data to the first thread, when the data is to be placed into the queue during processing of a second thread performed by the processor and identification information of the first thread has already been placed into the queue.

Still another embodiment of the present invention relates to an information processing apparatus. The information processing apparatus includes: a processor configured to process a thread that accesses an object requiring synchronization management; and a memory configured to store a queue that represents a pending queue of threads requesting access to the object, the queue being structured by a linked list such that the identification information of each thread is connected by a pointer indicating the identification information of a subsequent thread in the queue, wherein information concerning a current state of the object is appended to a head pointer, which is a pointer indicating the identification information of a first thread in the linked list, and wherein, when the thread requests access to the object, the thread determines whether or not access is granted by referencing the information concerning the current state of the object appended to the head pointer, and wherein, if access is not granted, the identification information of the thread is placed into the queue.

Still another embodiment of the present invention relates to an information processing method. The information processing method includes: referencing a queue when access needs to be made to an object requiring synchronization management during processing a thread, the queue being a pending queue requesting access to the object being structured by a linked list such that identification information of each thread is connected by a pointer indicating the identification information of a subsequent thread in the queue; determining whether or not access is granted by acquiring information concerning a current state of the object appended to a head pointer, which is a pointer indicating the identification information of a first thread in the linked list; and placing the identity information of the thread into the queue when access is not granted.

Optional combinations of the aforementioned constituting elements, and implementations of the invention in the form of methods, apparatuses, systems, computer programs, recording media that record the programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
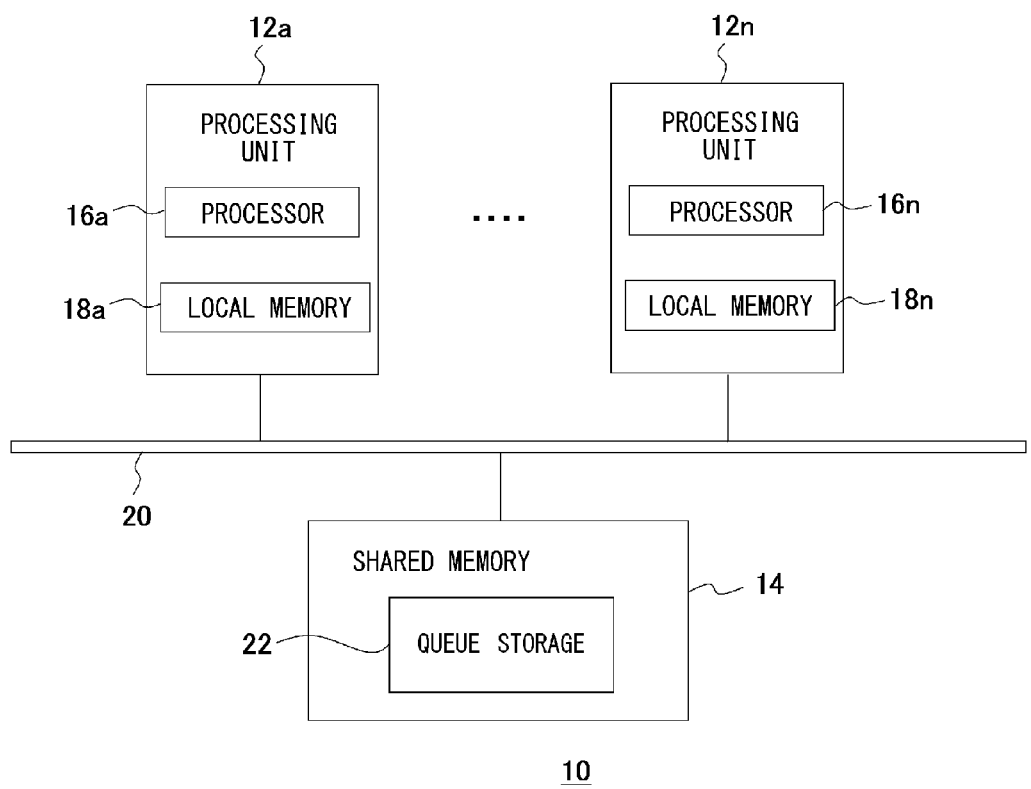
FIG. 1 illustrates a structure of an information processing apparatus in an embodiment of the present invention.

FIG. 1 illustrates a structure of an information processing apparatus in an embodiment of the present invention. An information processing unit 10 includes processing units 12a, ..., 12n and a shared memory 14 wherein the processing units 12a, ..., 12n and the shared memory 14 are connected via main bus 20. The processing units 12a, ..., 12n include processors 16a, ..., 16n and local memories 18a, ..., 18n, respectively. The processing units 12a, ..., 12n may further include components other than the processor 16a, ..., 16n and the local memories 18a, ..., 18n but those components other than them are omitted in FIG. 1.

A plurality of threads, which have been generated by the information processing apparatus 10 in order to achieve various functions, are processed in parallel by the processing units 12a, ..., 12n. Programs used to process the threads and various data are stored in the shared memory 14. The processors 16a, ..., 16n load necessary data into the local memories 18a, ..., 18n belonging to their respective processors from the shared memory 14, and start processing the threads.

When a time slice allocated to the started thread is exhausted or the thread is set to a standby state according to the processing progress, the processors 16a, ..., 16n will switch the processing object to another thread. Although, for ease of understanding, an entity performing processing may be hereinafter expressed as "threads", it means "a processor that processes the threads" in terms of hardware.

The scheduling that determines the order of the thread processing and the allocation of CPU time may be achieved by a scheduler provided by an OS or accomplished by a user-level scheduler. Such a scheduling as this is executed by any one of the processors 16a, ..., 16n as a thread.

As will be described later, in the present embodiment, there are two cases according to the state of a queue. The first case is where a thread being processed releases the processor and transitions to a standby sate. The second case is where the processing of the thread, which has transitioned to the standby state, can be started as a result of the processing of another thread. Thus, in such a case, a process that can achieve the transition of a thread is prepared in advance and said process will be executed upon request from the thread. Such a process as this may use software prepared by the OS or may be prepared by a user.

Figure 2:
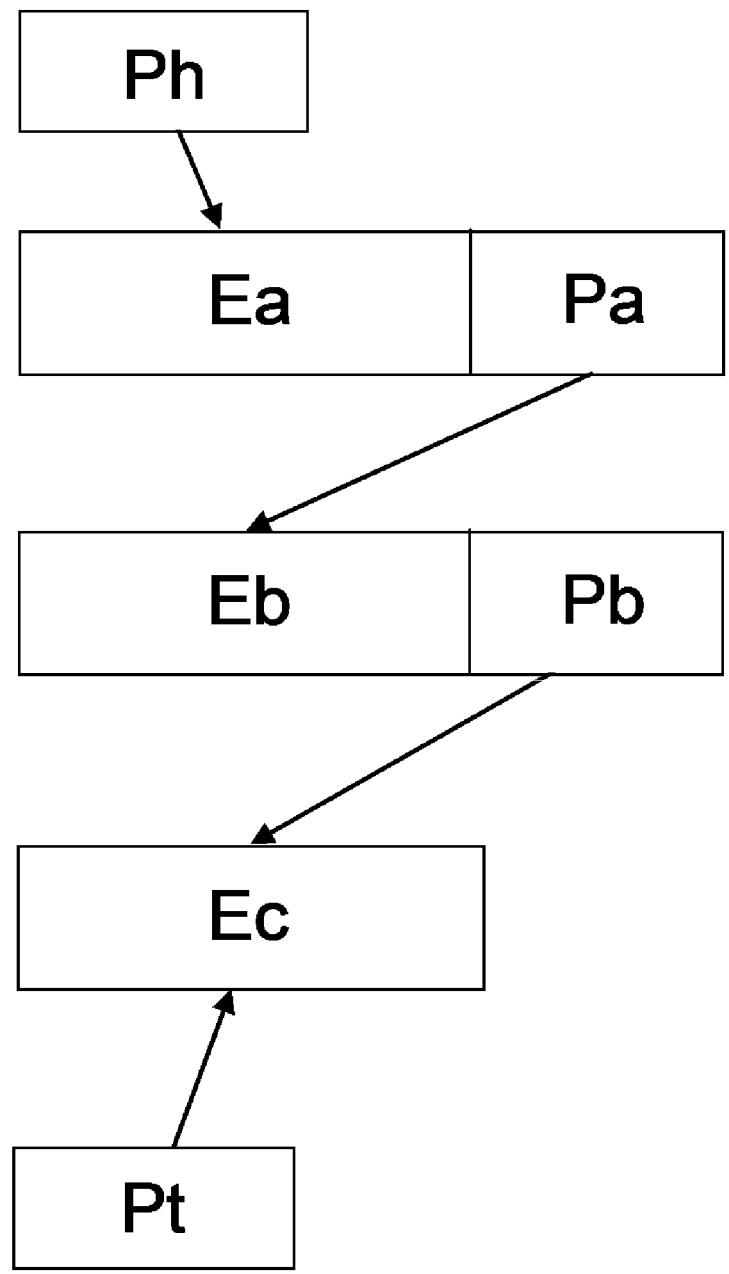
FIG. 2 illustrates an exemplary data structure of a waiting queue stored in queue storage according to an embodiment.

The shared memory 14 includes queue storage 22. The queue storage 22 is a storage area for storing a waiting queue (pending queue) such as data and threads that are pending. More specifically, the queue storage 22 is stored in the shared memory 14 to queue the pending data and threads. As will be described in detail later, a plurality of queue storage areas may be provided in association with the purposes of the waiting queue but hereafter they will be generically referred to as "queue storage 22". FIG. 2 illustrates an exemplary data structure of a waiting queue stored in the queue storage 22 according to the present embodiment.

The purpose of a waiting queue shown in FIG. 2 is not limited to any particular one, and a waiting entity may be a thread itself or data required for the processing of the thread so long as it is a queue necessary for the progress of the thread processing. For example, conceivable is a case where an event is generated and the identification information of the event is stored in the queue storage 22 and then another thread reads the identity information in the order that the identify information thereof has been stored and the event is processed based on the read-out identification information. In this case, a queue of identification information of events waiting for the processing is formed in the queue storage 22.

As illustrated in FIG. 2, the waiting queue as used in the present embodiment is implemented as a linked list. A linked list is of a structure such that a plurality of data are connected by pointers to addresses of the next data. Since the linked list 28 in the present embodiment forms a waiting queue, the order of links is the order in which data is stored in the queue storage 22. As already mentioned, waiting entities of queues may be conceivable variously depending on the purpose of the waiting queue but they are generically called an "element" or "elements" herein. In FIG. 2, "Ea", "Eb", and "Ec" represent elements stored in this order; "Ph", "Pa", "Pb", and "Pt" represent pointers; and the destination of each arrow from a pointer is an element stored at an address indicated by the pointer.

The pointer Ph is a head pointer and indicates the storage address of the element Ea that is stored first. The pointer Pa associated with the element Ea indicates the storage address of the element Eb that is stored next. The pointer Pb associated with the element Eb indicates the storage address of the element Ec that is stored subsequently. The pointer Pt is a tail pointer and indicates the storage address of the element Ec if the element stored last is the element Ec as shown in FIG. 2.

By implementing such a data structure as described above, elements and the order in which these elements are stored can be expressed explicitly no matter how many elements are stored. When, under a FIFO (First In, First Out) discipline, an element is to be retrieved or removed from a waiting queue (this is called "pop", "pop operator" or "pop operation"), the head pointer Ph is first referenced and then the address of the element Ea, which is stored first in the waiting queue, is acquired. After the element Ea is read out of said address, the head pointer Ph is updated to the storage address of the next element Eb. More specifically, the value of the pointer Pa associated with the element Ea is copied to the head pointer Ph.

When an element is to be placed in or added to the waiting queue (this is called "push", "push operator" or "push operation"), this element is stored in an empty area (free or unused area) of the queue storage 22 and then the address of the last element Ec in the waiting queue is acquired by referencing the tail pointer Pt. Then a new pointer indicating the address of the element to be added is associated with the element Ec and, at the same time, the tail pointer Pt is also updated to this address.

When the information shared by a plurality of threads, such as queues, is to be operated, regardless of whether the linked list is used or not, an exclusive control is generally required to keep the consistency of information. In such a case, even though, for example, the level of priority is high, the other threads must wait for their queue operations until a given thread completes a sequence of processes comprised of (1) acquiring a lock, (2) operating the queue, and (3) unlocking.

For the purpose of reducing the waiting time to get access to the queue thus generated, a non-blocking queue where the operation is performed without locking is achieved in the present embodiment. More specifically, a sequence of operations on a queue are performed in stages as a plurality of atomic operations (i.e., indivisible operations), and interrupting a queue operation by another thread is permitted between the atomic operations. The atomic operation is an operation guaranteed to be executed without interferences by other threads. The remaining part of the interrupted operation is taken over by a thread that has interrupted the operation and is completed thereby.

Figure 3:
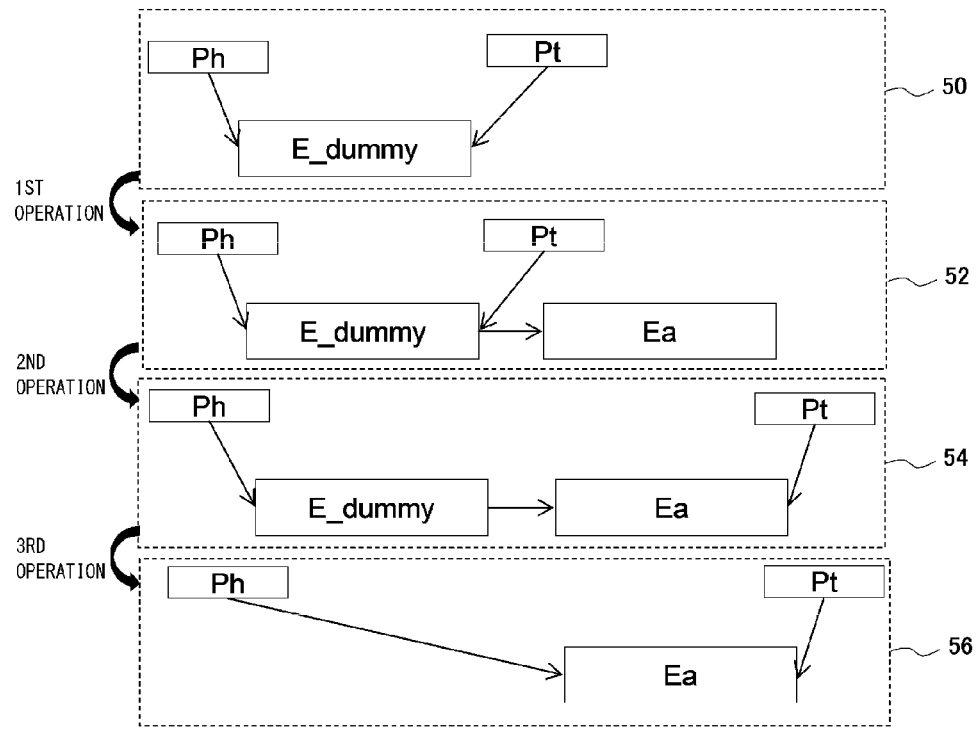
FIG. 3 illustrates how an element is pushed into queue storage in a state where no element is stored, in an embodiment.

FIG. 3 to FIG. 6 are diagrams for explaining in more detail a method for operating non-blocking queue according to the present embodiment. FIG. 3 illustrates how the element Ea is pushed into queue storage where no elements is placed. Assume that the state of queue storage transits in the order of a state 50, a state 52, a state 54 and a state 56 starting from the top (the state 50) of FIG. 3. Though how the state of queue storage is displayed in FIG. 3 is basically the same as the linked list 28 of FIG. 2, the pointers other than the head pointer Ph and the tail pointer Pt are indicated by arrows only. In other words, the starting point of an arrow is an element associated with each pointer, and the ending point thereof is an element stored at an address indicated by the pointer. The same applies to FIG. 4 to FIG. 6.

First, the state 50 represents an initial state where no elements is stored in the queue storage. At this time, a dummy element E_dummy is placed in the linked list. The dummy element E_dummy, which is not an effective element, is prepared beforehand at a predetermined address. In the case where the dummy element E_dummy is placed in the queue storage like this, information indicating that the element is a dummy element E_dummy is appended to a pointer indicating said element (i.e., the head pointer Ph in this example of FIG. 3). A method for appending other information to the pointer is similar to a method described later in connection with FIG. 12 and the like. Or the dummy element E_dummy may be identified by storing the identification information, indicating that the element is a dummy one, at the address indicated by the pointer. In the state 50, both the head pointer Ph and the tail pointer Pt indicate the address of the dummy element E_dummy. When a certain thread pushes the element Ea in this state, the element Ea will be first stored in an unused storage area. Then the state transits to the state 52 by associating the pointer, indicating an address of said storage area, with the dummy element E_dummy (this is called a first operation).

Then the tail pointer Pt is updated such that the tail pointer Pt indicates the address of the storage area in which the element Ea is stored. As a result, the state 52 transits to the state 54 (this is called a second operation). Then the head pointer Ph is updated to the value of the pointer associated with the dummy element E_dummy in the first operation. As a result, the state 54 transits to the state 56 where the head pointer Ph indicates the address of the element Ea (this is called a third operation). The above-described procedure completes a push processing where the first element is placed into the queue storage. According to the present embodiment, the pointers are updated on a step-by-step basis as described above. The first operation, the second operation, and the third operation are atomic operations, respectively.

Figure 4:
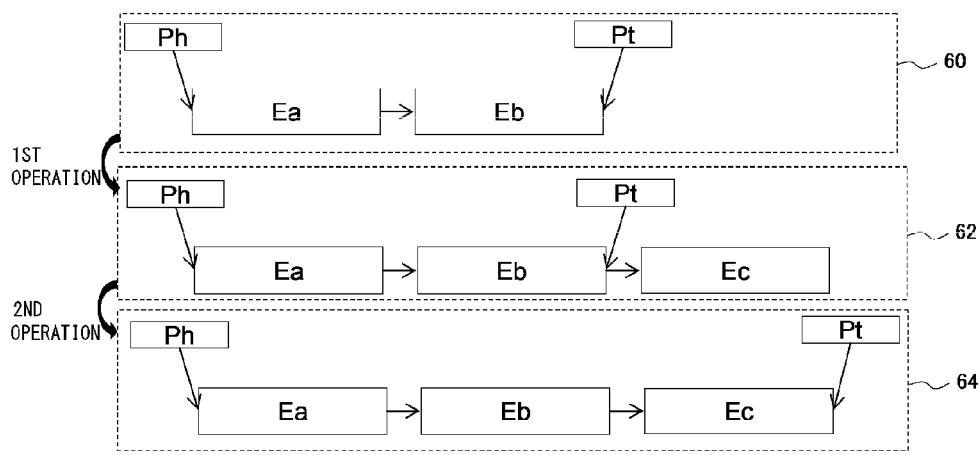
FIG. 4 illustrates how a new element is pushed into queue storage in a state where elements are stored, in an embodiment.

FIG. 4 illustrates how a new element Ec is pushed into queue storage in a state where the elements Ea and Eb are stored. In a first state 60, the head pointer Ph indicates the address of the element Ea which is stored first, and a pointer associated with the element Ea and the tail pointer Pt indicate the address of the element Eb, which is stored next to the element Ea and which is also stored last.

When a certain thread pushes the element Ec in this state 60, the element Ec will be first stored in an unused storage area. Then a pointer indicating the address of this storage area is associated with the element Eb, so that the state transits to a state 62 (first operation). Then the tail pointer Pt is updated such that the tail pointer Pt indicates the address of the storage area in which the element Ec is stored. As a result, the state transits to a state 64 (second operation). The above-described procedure completes a push processing where a new element is placed into the queue storage already having the elements. In this case, too, the pointers are updated on a step-by-step basis, and the first operation and the second operation are atomic operations, respectively.

Figure 5:
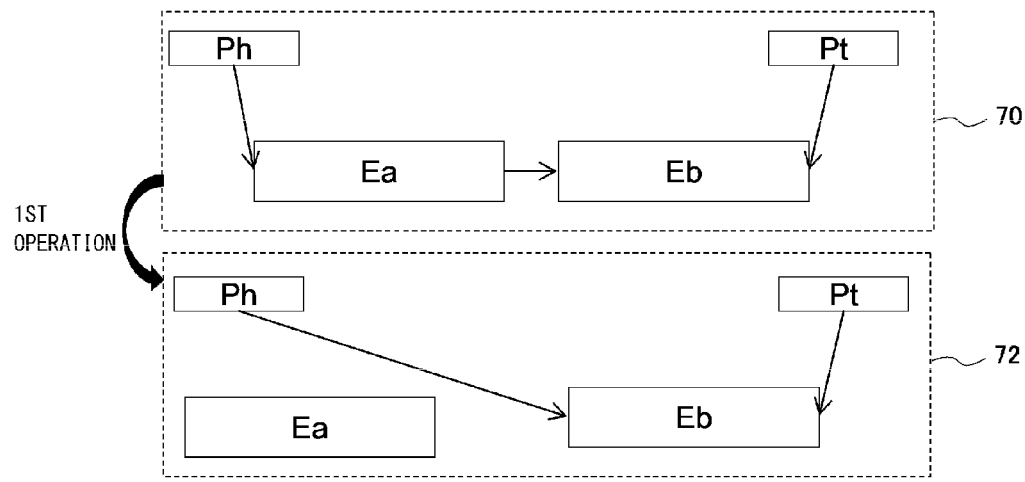
FIG. 5 illustrates how an element is popped from queue storage in a state where a plurality of elements are stored, in an embodiment.

FIG. 5 illustrates how the element Ea is popped from queue storage in a state where a plurality of elements Ea and Eb are stored. A state 70 is similar to the state 60 in FIG. 4. When a certain thread pops the element Ea, which was stored first, in this state 70, the address of the element Ea will be first acquired by referencing the head pointer Ph and then the element Ea stored in the thus acquired address will be read out into the local memory 18a or the like. Then the head pointer Ph is updated to the value of a pointer associated with the thus read-out element Ea. As a result, the state transits to a state 72 (first operation). The above-described procedure completes a pop processing where the element that was stored first is retrieved from the queue storage in which a plurality of elements are placed. The operation on the queue at this time, namely the first operation, is an atomic operation.

Figure 6:
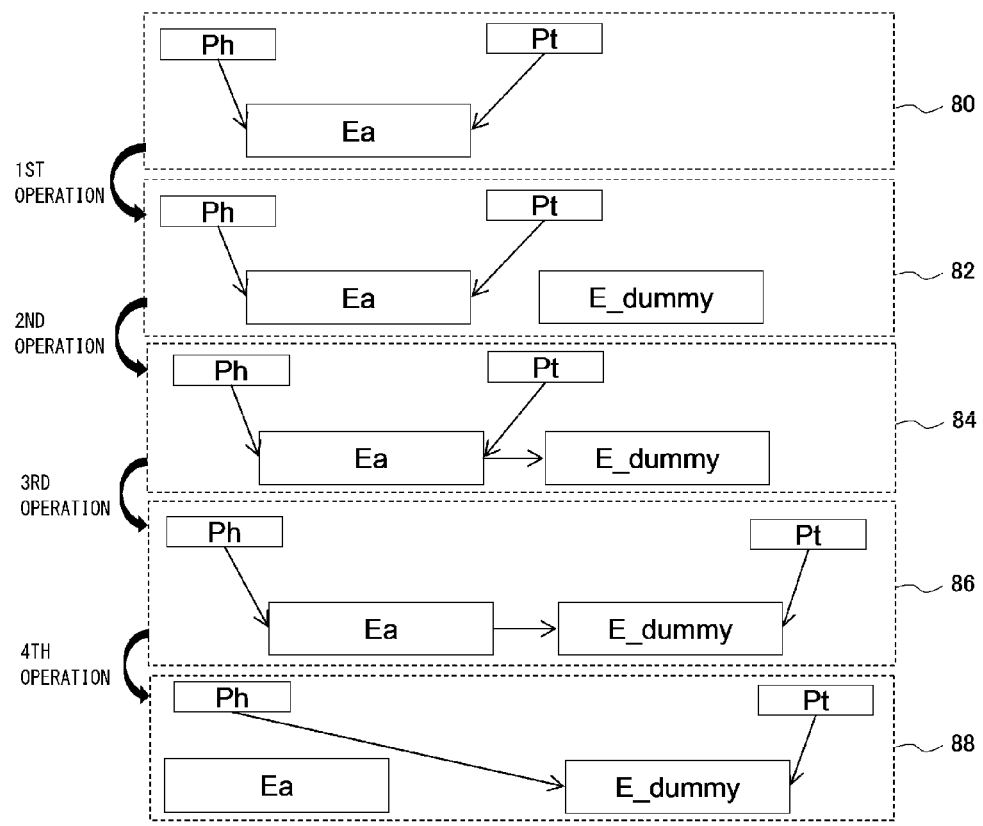
FIG. 6 illustrates how an element is popped from queue storage in a state where only the element is stored, in an embodiment.

FIG. 6 illustrates how the element Ea is popped from queue storage in a state where this single element Ea only is stored. In the first state 80, the head pointer Ph and the tail pointer Pt indicate the address of the element Ea that is the only element here. When a certain thread pops the element Ea in this state 80, it will be determined that the element Ea is the last element in the queue storage because both the head pointer Ph and the tail pointer Pt indicate the same address. And it will be determined that the dummy element E_dummy is not included in the queue storage. Then, the dummy element E_dummy undergoes the necessary initialization by storing the dummy element E_dummy in a predetermined storage area, for instance. As a result, the state transits to a state 82 (first operation).

Then a pointer indicating the address of the dummy element E_dummy is associated with the element Ea. As a result, the state 82 transits to a state 84 (second operation). Then, the tail pointer Pt is updated such that the tail pointer Pt indicates the address of the dummy element E_dummy. As a result, the state 84 transits to the state 86 (third operation). Then the address of the element Ea is acquired by referencing the head pointer Ph, and the head pointer Ph is updated to the value of a pointer associated with the element Ea, namely the address of the dummy element E_dummy. As a result, the state 86 transits to the state 88 (fourth operation)

At this time, the element Ea is read out into the local memory 18a or the like. The above-described procedure completes a pop processing where the last element is retrieved from the queue storage. Similar to what has been described so far, the first operation, the second operation, the third operation, and the fourth operation are atomic operations, respectively.

Any appropriate one of the respective sequences of operations shown in FIG. 3 to FIG. 6 can achieve all operations on queue storage. Since the queue storage is not locked herein, there is a possibility that another thread may interrupt a queuing operation in a period between the atomic operations, namely in the states 52 and 54 of FIG. 3, the state 60 of FIG. 4, the states 82, 84 and 86 of FIG. 6. If such an interrupt is caused, the thread that has interrupted the ongoing operation will take over the remaining operation of the interrupted operation under a certain condition before the thread that has interrupted starts its own intended operation.

Figure 7:
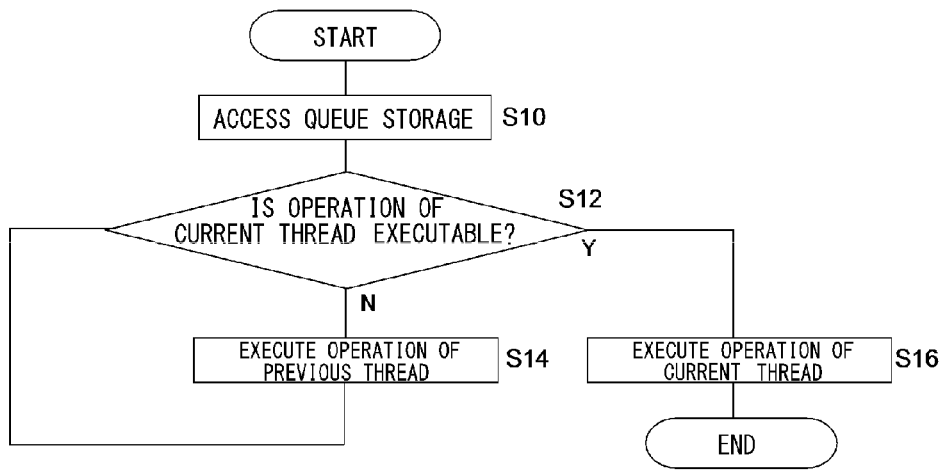
FIG. 7 is a flowchart showing a procedure, according to an embodiment, in which a thread operates on queue storage.

A description is now given of an operation required to achieve the takeover of the queuing operation. FIG. 7 is a flowchart showing a procedure in which a thread operates on queue storage. In the following flowcharts shown in FIG. 7 to FIG. 11, FIG. 15 and FIG. 16, the procedure is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S10)". If, on the other hand, the decision result is negative, "N" (the capital letter of "No") will be appended like "(N of S10)".

The processing of the flowchart shown in FIG. 7 starts when a certain thread accesses queue storage. The thread first accesses the queue storage for the purpose of popping or pushing an element (S10). Then the any one of operations described in connection with FIG. 3 to FIG. 6 is attempted. If, for example, the state is in the state 50 of FIG. 3 or in the state 60 of FIG. 4 in the case of a push operation, the thread can perform the operation. If the state is in the state 70 of FIG. 5 or in the state 80 of FIG. 6 in the case of a pop operation, the thread can execute the operation. In such a case (Y of S12), an operation primarily intended for the thread is executed (S16). Even though the state is not in any one of the states 50, 60, 70, and 80, the operation is executed where possible.

Consider, for example, a case like the state 84 of FIG. 6, where the tail pointer Pt does not indicate the last element. An element can be retrieved by a pop operation even in this state. This is because the element can be retrieved by referencing only the address indicated by the head pointer Ph. On the other hand, the push operation of an element requires the first operation, as described in connection with FIG. 4, where a new pointer indicating the address of the element to be pushed is associated with the rearmost element indicated by the tail pointer Pt. When, as with the state 84, the tail pointer Pt indicates the address of an element other than that of the rearmost element, the indicated element has already been associated with a pointer indicating an address of another element. As a result, the first operation cannot be performed.

When, as describe above, the primarily intended operation cannot be performed (N of S12), it is determined that the operation of another thread, which has been operating on the queue, has not yet been completed and therefore the remaining operation is first executed (S14). For example, suppose, as described above, that the tail pointer Pt does not indicate the address of the rearmost element. In this example, the link is traced back from the element indicated by the tail pointer Pt so as to identify the rearmost element, and then the tail pointer Pt is updated with the address of the thus identified element. Variations of abnormal states hindering the primarily intended operation and operations to be performed on the respective states in Step S14 are associated with each other and are stored beforehand in the shared memory 14, and they are referenced as necessary.

Then, the primarily intended operation is attempted (S12). If not operable, an operation corresponding to the then abnormal state will be executed (N of S12, S14). These processes are repeated until the primarily intended operation can be executed, and thereby the operation that remains to be done by the previous thread is practically taken over. After that, the primarily intended operation is executed (Y of S12, S16).

If another thread interrupts for the purpose of retrieving an element in the state 86 where the third operation of FIG. 6 has been completed, the remaining operation of the previous thread, namely the pop operation of the element Ea, will be executed as the primarily intended operation of the current thread because the pop operation of the element Ea agrees with the operation primarily intended by the thread that has interrupted the process. In this case, when the interrupted thread accesses the queue storage for the next time, the process will start from the execution of the first operation by which to retrieve an element, namely the first operation of FIG. 6. If only the dummy element E_dummy exists in the queue storage at this time, the operation is terminated as a case of error.

In the present embodiment as described above, the queue storage is not locked and a sequence of operations are performed in multiple stages through a plurality of atomic operations. As a result, the state where a thread waits ready for an access to the queue storage and therefore the processing efficiency of the information processing apparatus as a whole improves. Also, the thread that has interrupted an access to the queue storage takes over the remaining operation left incomplete by the previous thread. Thus, even though a temporary abnormal state occurs in a queue by an interrupt, such an abnormal state can be corrected every time it occurs and therefore the consistency of the queue can be kept intact.

A description is now given of various modes of embodiment to improve the processing efficiency furthermore by use of the non-blocking queue as described above.

(1) Queue in Consideration of a Thread Waiting for Data

There are cases where no data is stored in queue storage even though a certain thread accesses the queue storage for the purpose of pop of data, such as a case when the data stored in the queue storage have all been read out. In such a case, the thread is generally in a busy-wait state until data is newly stored in the queue storage, and the CPU resource is wasted. According to the present embodiment, "data" used to process the thread and "thread information" such as the identification information of the thread are mixed together in a queue as the "element" in the explanation of the aforementioned non-blocking queue. As a result, the absence of data and a wait state of thread are directly linked to each other to make the processing more efficient.

Figure 8:
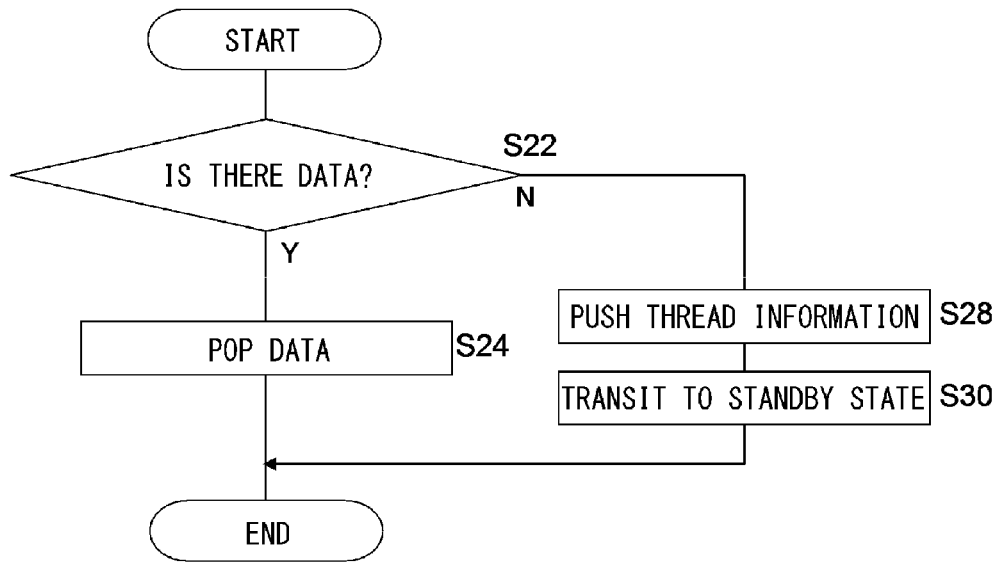
FIG. 8 is a flowchart showing a basic procedure according to an embodiment in consideration of a case where no data to be retrieved is in queue storage.
Figure 9:
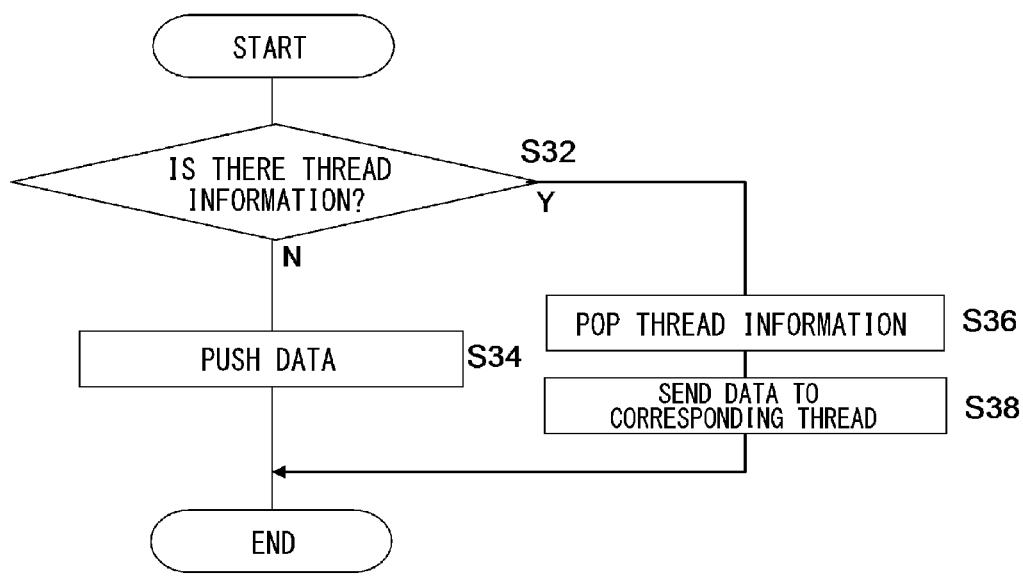
FIG. 9 is a flowchart showing a basic procedure according to an embodiment in consideration of a case where no data to be retrieved is in queue storage.

In this case, the structure of the information processing apparatus is similar to that described in connection with FIG. 1. Since a non-blocking queue is used herein, the operation on the queue storage may be similar to that explained in connection with FIG. 3 to FIG. 7. FIG. 8 and FIG. 9 are each a flowchart showing a basic procedure in consideration of a case where no data to be retrieved is in queue storage. FIG. 8 is a flowchart in a case where it is desired that the data be popped, and this processing of the flowchart is started when the thread accesses queue storage to pop the data.

First, the thread checks to see if there is data that can be popped off the accessed queue storage and retrieves the data if there is such data in the queue storage (Y of S22, S24). If, on the other hand, there is no such data, the thread will push the thread information, containing its own identification information, into the same queue storage and then the thread will release the processor and transit to a standby state (N of S22, N28, S30). That is, if there is no data to be retrieved, the thread will switch the operation on the queue storage to the push operation of the thread information and then transit to the standby state. At this time the thread information is stored in the queue storage. Further, at this time, the information indicating that the thread information has been stored may be appended to the head pointer indicating the pushed thread information. If, in Step S22, a dummy element or thread information only is stored in the queue storage, it may be determined that there is no data in this queue storage (N of S22).

FIG. 9 is a flowchart in a case when it is desired that data be pushed, and this processing starts when a thread accesses queue storage to push the data. In this case, the thread first checks to see if there is the thread information in the accessed queue storage. And if there is no thread information in the queue storage, the data will be directly pushed so as to achieve the intended operation (N of S32, S34). If, on the other hand, there is the thread information in the queue storage, it will be determined that there is a thread that awaits data. And the thread information is popped and the data is directly sent to a thread identified based on the popped thread information (Y of S32, S36, S38). In the mode where the information indicating that thread information is stored is appended to the head pointer when the thread information is pushed, the decision on Step S32 is made by referencing the head pointer.

In the actual processing of Step S38, the thread, which is to push the data, stores said data in an area in the shared memory 14 allocated to a thread to which the data is to be sent, and the thread information popped is sent to a process that starts the thread processing. This resumes the processing of this thread. Thus, in the push operation of the data, too, the operation is switched to the pop operation of the thread information if the thread information is stored in the queue storage.

Such a processing as described above can simultaneously manage both the waiting queue of data and the waiting queue of threads in single queue storage. The absence of data and the wait state of thread are directly linked to each other, so that both of them can be operated in an atomic manner. Hence, the time required for the processing used for the management can be reduced. Also, the thread does not become a busy-wait state when there is no data, so that the processor can be released instantaneously. Hence, the processing efficiency of the information processing apparatus as a whole improves.

FIG. 8 and FIG. 9 are each a procedure for incorporating the waiting queue of threads into the queue storage of data required for the processing of the thread. This method according to an embodiment is applicable to queue storage other than the queue storage of data. The similar operation may be performed on queue storage of empty packets that is need in pushing data into queue storage, for instance. Here, a packet is such that a predetermined unit of storage area that stores the data is substantialized as a container for holding the data. And the number of usable packets is predetermined, so that the area usable for queue storage in the shared memory can be restricted. The concept of packet is widely introduced in various technical fields such as communications via a network.

Figure 10:
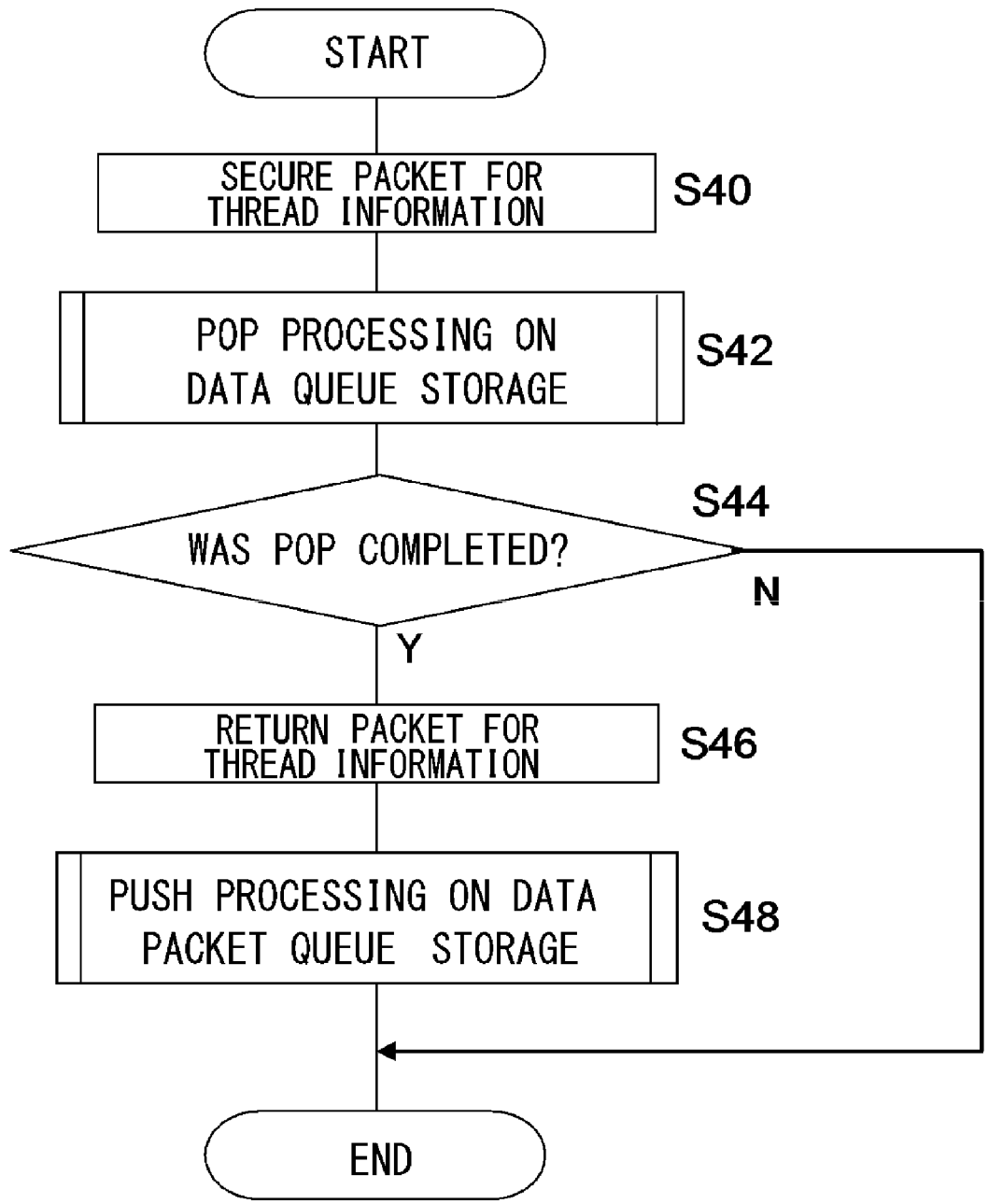
FIG. 10 is a flowchart showing a procedure, according to an embodiment, by which a waiting queue of threads is incorporated into both data queue storage and a packet queue storage.
Figure 11:
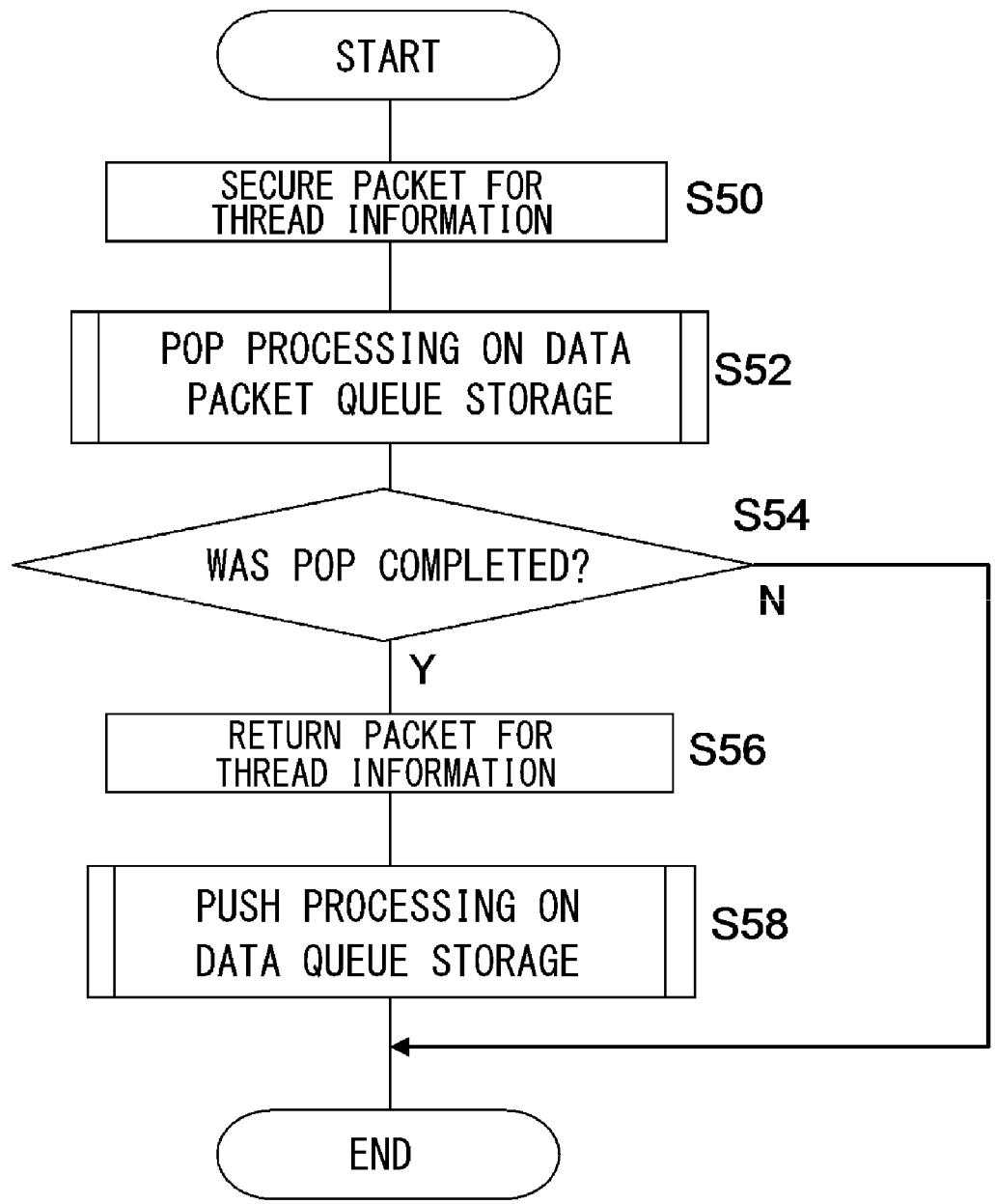
FIG. 11 is a flowchart showing a procedure, according to an embodiment, by which a waiting queue of threads is incorporated into both data queue storage and a packet queue storage.

FIG. 10 and FIG. 11 are each a flowchart showing a procedure by which a waiting queue of threads is incorporated into both data queue storage and packet queue storage. In this case, queue storage of empty packets for data, which is used to store the data, and queue storage of empty packets for thread information, which is used to store the thread information, are provided as the queue storage of empty packets. Both of the queue storage for empty packets are constituted by non-blocking queue.

The queue storage of empty packets for data and the queue storage of empty packets for thread information are each queue storage for indicating the address of empty packets, i.e., a region, where no data or thread information to be read out is pending or stored, in each of the regions of the shared memory segmentalized as packets. In contrast thereto, data queue storage is queue storage for indicating the address of a region where data or thread information before readout is stored.

For example, a sequence of processes where an empty packet for data is popped off of queue storage of empty packets for data and then data is placed thereinto so as to be pushed into the data queue storage are processed as follows in the actual setting. That is, a pointer associated with or indicating an unused storage area is acquired from the queue storage of empty packets for data, then new data is written in the storage area, and a pointer associated with this storage area is added to the queue storage for data. Conversely, a sequence of processes where an empty packet, which is no longer required after the data has been popped off of the data queue storage, is pushed into the queue storage of empty packets for data are processed as follows in the actual setting. That is, in this sequence of processes, the data in a region indicated by the pointer of the data queue storage is read out and then a pointer indicating this region is added to the queue storage of empty packet for data. The same applies to the thread information.

FIG. 10 is a flowchart showing a procedure performed when the procedure is intended to pop data from queue storage. This processing starts when data needs to be popped in a thread processing. A thread first secures an empty packet for thread information from queue storage for empty packets for thread information (S40). Then the thread accesses data queue storage and performs a pop processing (S42). In this Step S42, if there is data that can be popped, it will be popped; if there is no data, the thread information will be pushed, as described in connection with FIG. 8. If the thread information is pushed, the thread will be stored in the empty packet for thread information secured in Step S40 and then the thus stored thread information is stored in the data queue storage.

If the data cannot be popped in Step S42 and the thread information is pushed, this thread will be in a standby state and therefore the pop processing of the data will be once terminated (N of S44). If, on the other hand, the data can be popped (Y of S44), the empty packet for thread information, which is no longer needed, will be returned to the queue storage of empty packets for thread information (S46). This processing actually corresponds to a push operation on the queue storage of empty packets for thread information.

Further, in order to return the empty packet for data, whose loading into a local memory or the like has already been completed, the queue storage for empty packets for data is accessed and the push operation is performed on the accessed queue storage (S48). This processing can be achieved using the same procedure by replacing "data" in the flowchart described in connection with FIG. 9 by "empty packet for data". In other words, if there is thread information in the queue storage of empty packets for data, the thread information will be popped and the empty packet for data will be directly sent to said thread; if there is no thread information in the queue storage of empty packets for data, the empty packet for data will be pushed.

FIG. 11 is a flowchart showing a procedure performed when the procedure is intended to push data into a queue storage. This processing starts when data needs to be pushed in a thread processing. A thread first secures an empty packet for thread information from queue storage for empty packets for thread information (S50). Then the queue storage for empty packets for data is accessed, and the pop operation for empty packets for data is executed (S52).

This processing can be achieved using the same procedure by replacing "data" in the flowchart described in connection with FIG. 8 by "empty packet for data". In other words, if there is an empty packet for data, the empty packet for data will be popped; if there is no empty packet for data, the thread information will be pushed. If the thread information is pushed, the thread information will be stored in the empty packet for thread information secured in Step S50 and then the thus stored thread information is stored in the queue storage of empty packets for data.

If the empty packet for data cannot be popped in Step S52 and the thread information is pushed, this thread will be in a standby state and therefore the push processing of the data will be once terminated (N of S54). If, on the other hand, the empty packet for data can be popped (Y of S54), the empty packet for thread information, which is no longer needed, will be returned to the queue storage of empty packets for thread information (S56). This processing actually corresponds to the push operation on the queue storage of empty packets for thread information.

Further, the data queue storage is accessed, and the push operation of the data is done using the empty packet for data popped in Step S52 (S58). In this case, as described in connection with FIG. 9, if there is thread information in the queue storage of data, the thread information will be popped and the data will be directly sent to said thread; if there is no thread information in the queue of data, the data will be pushed.

By employing the structure as described above, the processor can be released, without entering the busy-wait while waiting for access to a queue storage, not only in the pop/push operation on data required for the thread processing but also in the processing of securing the empty packets before and after the pop/push operation and returning them. Since each queue storage is non-blocking, the wait time of thread while waiting for the queue access can be reduced in both stages of securing an empty packet and reading out data.

(2) Semaphore

Semaphore is widely used as a method for synchronizing the resource usages of resources used commonly by a plurality of threads. More to the point, the shared memory is provided with a counter that counts the number of usable resources; when the resources are used, the value indicated by the counter is decremented by the number of resources used, whereas when the use of resources is completed and therefore the resources are released, the value indicated by the counter is incremented by the number of resourced released. For example, consider a case where the right of access to a device and memory is set as the resource. In this case, if the upper limit of the number of simultaneously accessible threads is set as the initial value of the counter and if the counter takes integer values only, the value indicated by the counter will be "0" when the number of accesses reaches the upper limit, and further access will not be allowed in such a condition.

Figure 12:
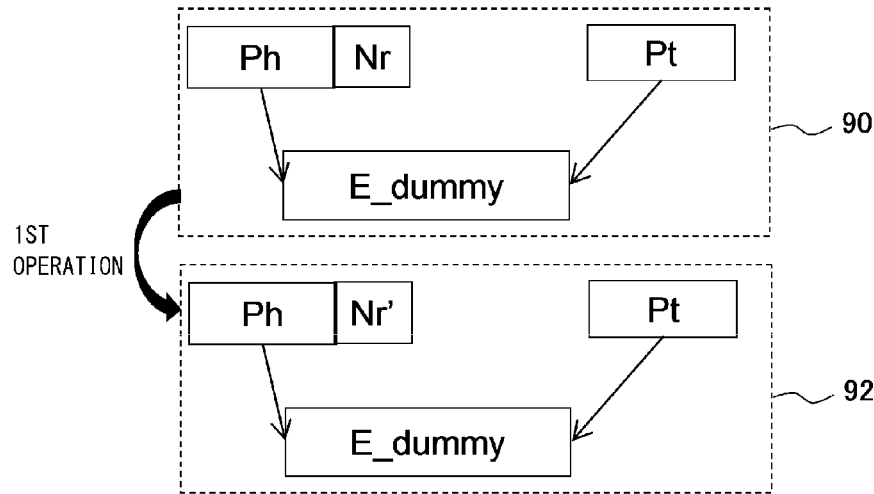
FIG. 12 schematically illustrates a structure of and how to use a linked list stored in queue storage to achieve functions of semaphores according to an embodiment.

A description is given herein of a method where the functions of semaphores are efficiently achieved using a structure of non-blocking queue. FIG. 12 schematically illustrates a structure of and how to use a linked list stored in queue storage 22 to achieve functions of semaphores. Though the structure of linked list and the basic operation on the queue storage are the same as those described so far, information concerning the number of resources is appended to the pointers of the linked list for semaphore function. In FIG. 12, a counter value Nr indicating the number of currently usable resources is appended to the head pointer Ph of a state 90.

If every one of threads does not use a given resource, the counter value Nr will indicate a preset upper limit. In the present embodiment, as will be described hereinbelow, a waiting queue of threads by which to acquire resources is incorporated into the mechanism of semaphore. Accordingly, the counter value Nr is not limited to integers and the cases where the number of resources is insufficient will be expressed by negative values. The number of resources requested will also be expressed by a negative value.

If a certain thread makes a request for a resource in the state 90, the head pointer Ph will first be referenced and then the counter value Nr appended to the head pointer Ph will be acquired. If the requested number of resources is less than or equal to the counter value Nr, this means that the thread can acquire the requested number of resources and then the counter value will be updated so that the requested number will be subtracted from the initial counter value Nr (the thus updated counter value is denoted "Nr'" in FIG. 12). As a result, the state 90 transits to a state 92 and the acquisition process in the case where the number of resources is sufficient for the requested number thereof is completed.

It is assumed herein that the first operation is an atomic operation as well. Accordingly, the counter value Nr should be of a data size such that the atomic operation is possible even when the operation is done with the pointer. If, for example, the data size with which the atomic operation is possible is in units of 4 bytes, 3 bytes will be allocated to the pointer and 1 byte to the counter value Nr. If the size is insufficient, the pointer will be set to an indexed structure, for instance. And when the linked list is operated, only the indices of the pointer is operated and the actual address is looked up only when a data access is needed. If a certain thread is released in the state 90, the counter value will be updated by adding the number of resources released to the counter value Nr.

Figure 13:
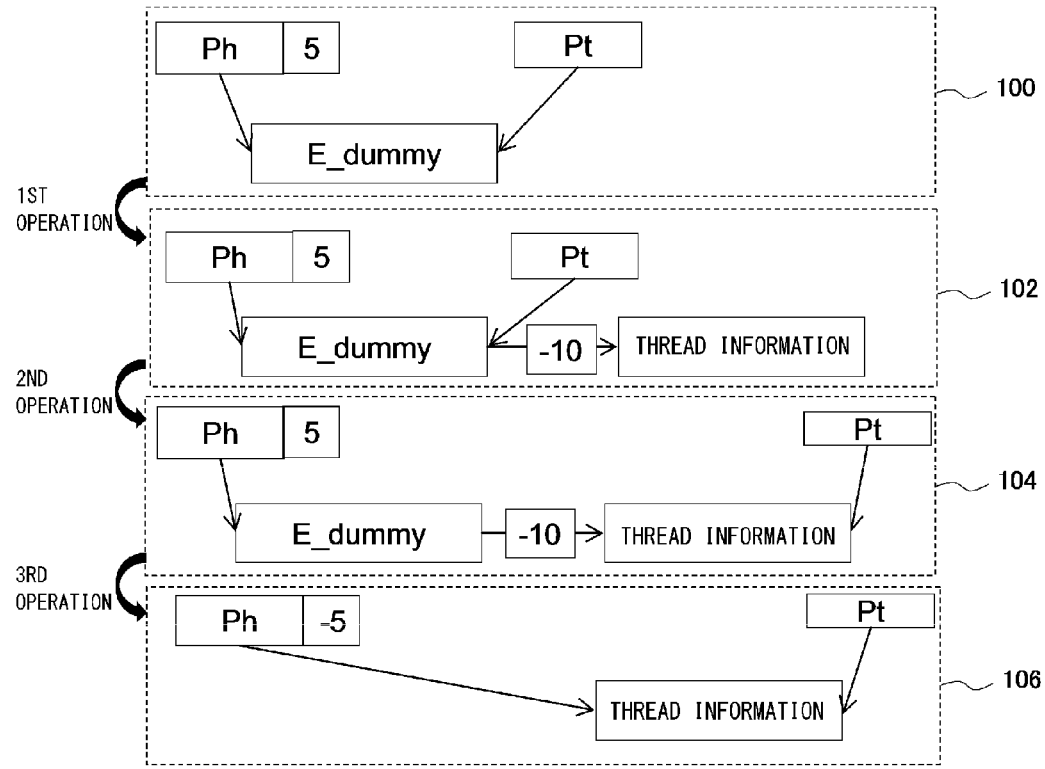
FIG. 13 illustrates how a linked list is operated, according to an embodiment, when resources are insufficient to handle the number of resources requested.

FIG. 13 illustrates how a linked list is operated when the resources are insufficient to handle the number of resources requested. For ease of understanding, specific values are used here for the counter value and the number of requests. In a state 100, the counter value Nr appended to the head pointer Ph is "5", which indicates that five resources are usable. Assume that in this state a certain thread makes a request for 10 resources. Then this thread references the counter value "5" appended to the head pointer Ph and determines that the counter value "5" is less than the requested number of resources. And this thread starts a push operation on queue storage to place its own thread information into the queue storage.

At this time, the thread information is first stored in an empty storage area. Then the requested number of resources is appended to a pointer indicating the address of said storage area as a negative value and the pointer is associated with the dummy element E_dummy. As a result, the state 100 transits to a state 102 (this is called a first operation). In the state 102 and the like, the values indicated near arrows representing the pointers other than the head pointer Ph and tail pointer Pt are the requested number of resources appended to these pointers. In this example, the number of resources requested is 10 and therefore "−10" is appended to the pointer. In this manner, the information appended to a pointer excluding the head pointer Ph is the number of resources, requested by the next thread, which is indicated by said pointer.

Then the tail pointer Pt is updated such that the tail pointer Pt indicates the address of the thread information pushed. As a result, the state 102 transits to a state 104 (this is called a second operation). Then the head pointer Ph is updated to the value of a pointer associated with the dummy element E_dummy. As a result, the state transits to a state where the head pointer Ph indicates the address of the thread information. Simultaneously, the requested number of resources appended to the pointer associated with the dummy element E_dummy is added to the counter value appended to the head pointer Ph, so that the resulting counter value is appended to the head pointer Ph after the update. In FIG. 13, −5, which is equal to 5-10, is appended to the head pointer Ph.

As a result of the above-described third operation, the state 104 transits to a state 106. As mentioned earlier, when the counter value Nr appended to the head pointer Ph is a negative value, the negative value represents how many resources are in short. In this case, a waiting queue of threads waiting to acquire the resources is formed. If, in the state 106, still another thread makes a request for resources, the thread information will be pushed and the requested number of resources for said thread will be appended to a pointer indicating the added thread information. As described before, the first operation, the second operation and the third operation are performed in an atomic manner, respectively.

Figure 14:
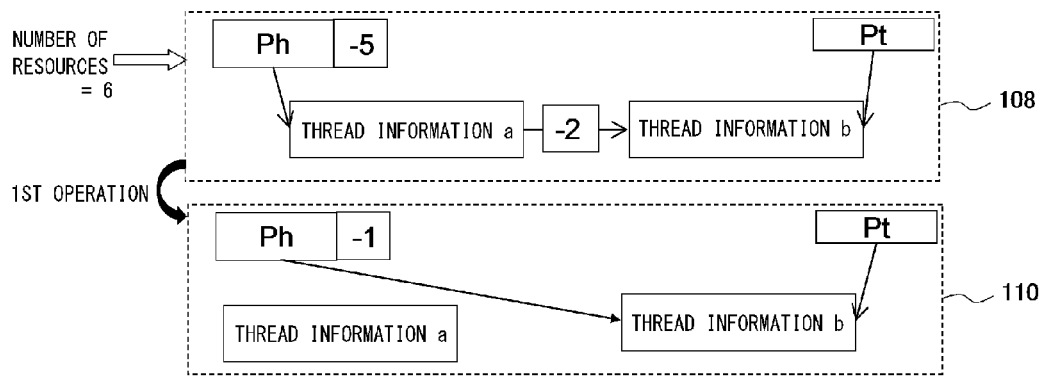
FIG. 14 illustrates how a linked list is operated when resources are released when there is a thread waiting to acquire the resource according to an embodiment.

FIG. 14 illustrates how a linked list is operated when resources are released when there is a thread waiting to acquire a resource. In a state 108 of FIG. 14, two threads are waiting to acquire resources, and their respective thread information, namely thread information a and thread information b, are stored in the queue storage in this order. The number of insufficient resources relative to the number of resources requested by the first thread in the waiting queue is represented by the counter value, appended to the head pointer Ph, which is "−5" in this example. The number of resources requested by the next thread in the waiting queue, which corresponds to the thread information b, is appended to the pointer associated with the thread information a. In FIG. 14, "−2" is appended thereto.

Assume herein that a certain thread releases 6 resources in this state 108. In this case, the thread first references the counter value appended to the head pointer Ph and then determines that there is a thread waiting to acquire resources, based on the fact that the counter value appended thereto is a negative value. Then the number of resources released is added to the counter value, thereby setting a new counter value. If the new counter value is "0" or above, the first thread in the waiting queue can acquire the requested number of resources and therefore the thread information a corresponding to the first thread will be removed from the waiting queue by a pop operation. In this example, the number of resources released is "6", the counter value is "−5" and the new counter value is "1", so that the thread information a will be popped off the queue.

At this time, the head pointer Ph is updated to the value of a pointer associated with the popped thread information a. At the same time, the number of resources, requested by the next thread, which is appended to this pointer is further added to the new counter value that has already been calculated, and this counter value added therewith is appended to the head pointer Ph. In the example of FIG. 14, the counter value immediately after the first thread has acquired the resource is "1" as described above, and the number of resources requested by the next thread is "−2". Hence, −1, which is equal to 1-2, is appended to the head pointer Ph. Through this first operation, the state 108 transits to a state 110.

If, as in this example, the counter value is negative, this means that the number of usable resources is insufficient in the light of the number of resources requested by a thread, which is indicated by the head pointer Ph, and therefore further thread information will not be popped until the resource(s) is/are released for the next time. If, on the other hand, the counter value is positive in the state 110, this means that the next thread waiting to acquire resources can acquire the resources and therefore the thread information will be popped in succession. The thus popped thread information will be supplied to a process by which the thread processing is started, which in turn resumes the processing of the thread using the acquired resources. When the last thread information in the waiting queue is to be popped, the dummy element is pushed the same way as described in connection with FIG. 6.

Figure 15:
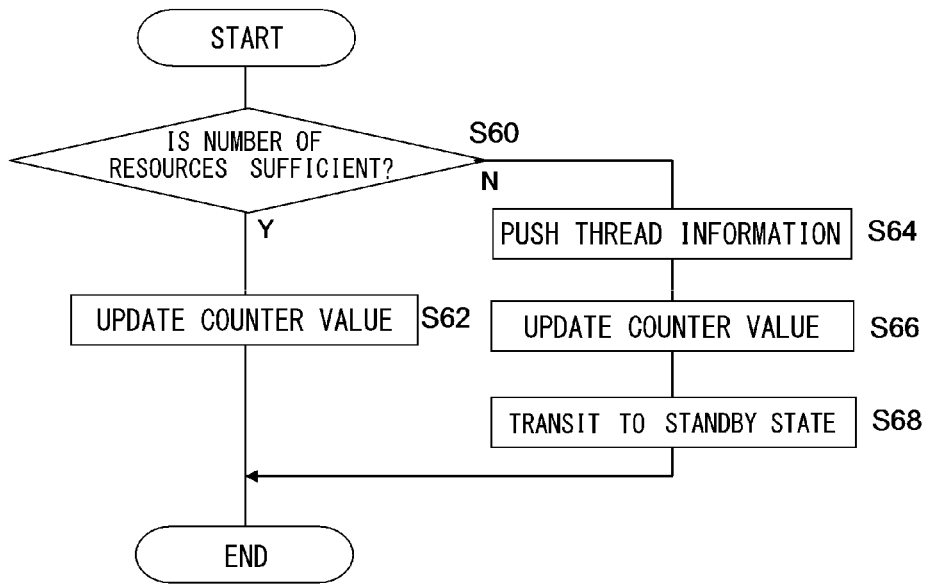
FIG. 15 is a flowchart showing a procedure, according to an embodiment, performed when resources are requested.

FIG. 15 is a flowchart showing a procedure performed when resources are requested. The processing of the flowchart shown in FIG. 15 starts when a thread requesting the resources accesses the queue storage. The thread first references the counter value appended to the head pointer Ph and thereby determines whether or not the number of usable resources is sufficient in the light of the requested number of resources (S60). If the number of usable resources is sufficient (Y of S60), the requested number thereof will be subtracted from the counter value to update the counter value and then acquire the requested resources (S62).

If the number of resources usable is insufficient (N of S60), its own thread information will be pushed into the queue storage (S64). Then the requested number thereof will be subtracted so as to update the counter value (S66). At this time, the counter value becomes a negative value. Then the thread releases the processor and transits to a standby state (S68).

Figure 16:
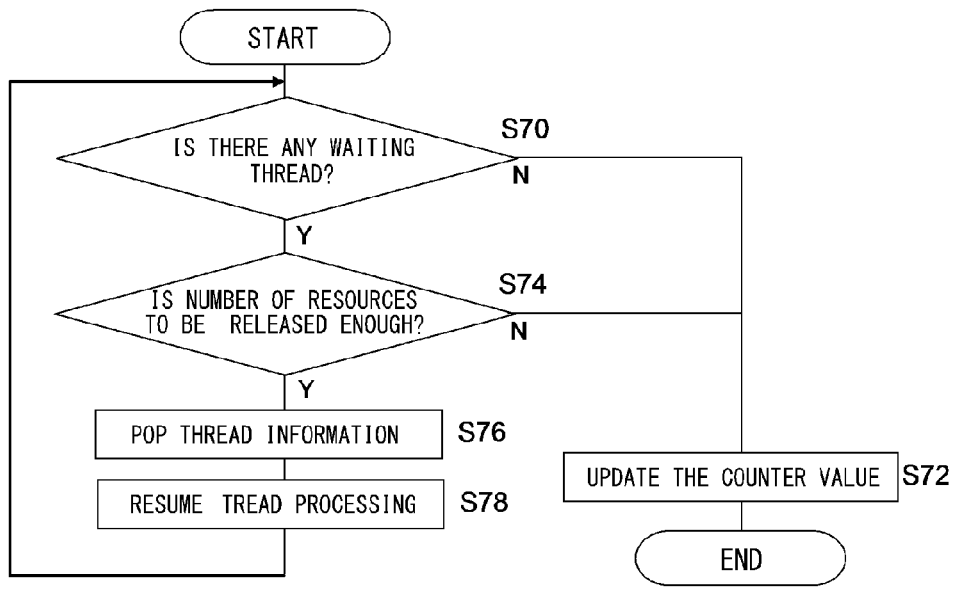
FIG. 16 is a flowchart showing a procedure, according to an embodiment, performed when resources are released.

FIG. 16 is a flowchart showing a procedure performed when resources are released. The processing of the flowchart shown in FIG. 16 starts when a thread releasing the resources accesses queue storage. The thread first checks to see if the counter value appended to the head pointer Ph is a negative value and thereby determines whether or not there is any thread that waits to acquire resource(s) (S70). If there is no thread waiting to acquire them (N of S70), the number of resources to be released is added to the counter value to update the counter value, which in turn completes the releasing processing (S72).

If there is a thread waiting to acquire resource(s) (Y of S70), whether or not the number of resources to be released is enough to cover the number of insufficient resources relative to the number of resources requested by the first thread in the waiting queue will be determined (S74). As already mentioned, if the new counter value in which the number of resources to be released has been added to the initial counter value is "0" or above, it may be determined that the number of resources is sufficient. If the number of resources to be released is enough to cover the number of insufficient resources (Y of S74), the thread information on the first thread will be popped off of the waiting queue (S76) and the processing of the thread will be resumed using the acquired resources (S78).

If there are subsequent threads in the waiting queue (Y of S70) and if the remaining number of released resources relative to the number of resources requested by the subsequent threads is enough (Y of S74), the thread information will be popped and then thread processing will be resumed for each of the subsequent threads (S76, S78). If there is no thread waiting to acquire the resources (N of S70) or if the number of released resources is not enough (N of S74), the counter value will be appended to the head pointer Ph as the final counter value at that point in time and the releasing processing will be terminated (S72).

By employing the structure as described above, the function of semaphore and the function of a queue of threads waiting to acquire the resources can be simultaneously achieved. Note that these functions can be simultaneously achieved by an atomic operation on the identical queue storage. Thus, when the resource is insufficient, the processor can be released by having the state of the thread, which has requested the resources, transit immediately to a standby state. Also, when the resources become available, the processing of the thread in standby state can be resumed at once.

Since these processes are each carried out in a non-blocking manner, the wait time of thread can be reduced in the step of accessing queue storage, the steps of requesting and releasing the resources, the step of state transition of a thread, and the step of resuming the processing, respectively.

(3) Reader/Writer (RW) Lock

A reader (R) lock and a writer (W) lock are available as a control method for accessing data stored in the shared memory by multiple threads. In a period of time during which a certain thread acquires an R lock in order to read the data, the other threads can generally acquire R locks as well, thereby allowing a plurality of threads to simultaneously perform readout operations. On the other hand, in a period of time during which a certain thread acquires a W lock in order to write data, the other threads are not allowed to access the data. As such, the consistency of data is guaranteed.

The R lock and the W lock do not occur simultaneously. For example, a thread, wishing to write data, waits until the R lock acquired by other thread is released, and then writes the data after acquiring a W lock. If another thread has already acquired an R lock, a thread, wishing to read data, will also acquire an R lock and start reading. If, on the other hand, another thread has already acquired a W lock, the thread will wait until the W lock is released and then read the data after acquiring an R lock.

A description is now given of a method by which the RW lock is efficiently managed using the structure of a non-blocking queue. In this case, too, a waiting queue of threads to acquire locks is incorporated into the management mechanism of the RW lock, similarly to the above description given of the semaphore. Accordingly, RW lock information is appended to the pointes in the linked list. Here, the RW lock information includes a state of the current lock and information on the type of lock requested by a thread that waits to acquire the lock.

The state of the current lock corresponds to the number of threads that have acquired R lock and the number of thread that have acquired W lock. In the description given hereinbelow, the former is denoted by the variable R and the latter the variable W. As described above, the maximum value of the variable W is "1", whereas no particular upper limit is set to the variable R. When the variable R takes values other than "0", the variable W is "0"; when the variable W is "1", the variable R is "0". The structure of a linked list and the operation thereof are basically the same as those explained about the semaphore.

In a state, for example, where there is no thread that waits to acquire lock, the state of the current lock, instead of the counter value Nr described in connection with FIG. 12, is appended to the head pointer Ph. If, on the other hand, there is a thread that waits to acquire lock, the type of lock requested by the first thread in the linked list, namely the information indicating an R lock or W lock, is further appended to the head pointer Ph.

In a state of R=0 and W=0 where no locks is acquired by any threads, a thread can immediately acquire either one of R lock and W lock. More specifically, the thread first references the head pointer Ph and then acquires the state of the current lock appended to the head pointer Ph. If R=0 and W=0 as in the above case, the thread acquires an R lock or W lock by incrementing the variable R or variable W according to the type of lock requested by the thread itself. Even though R is of a value other than "0", the R lock can be acquired by incrementing the variable R if the thread requests the R lock.

Figure 17:
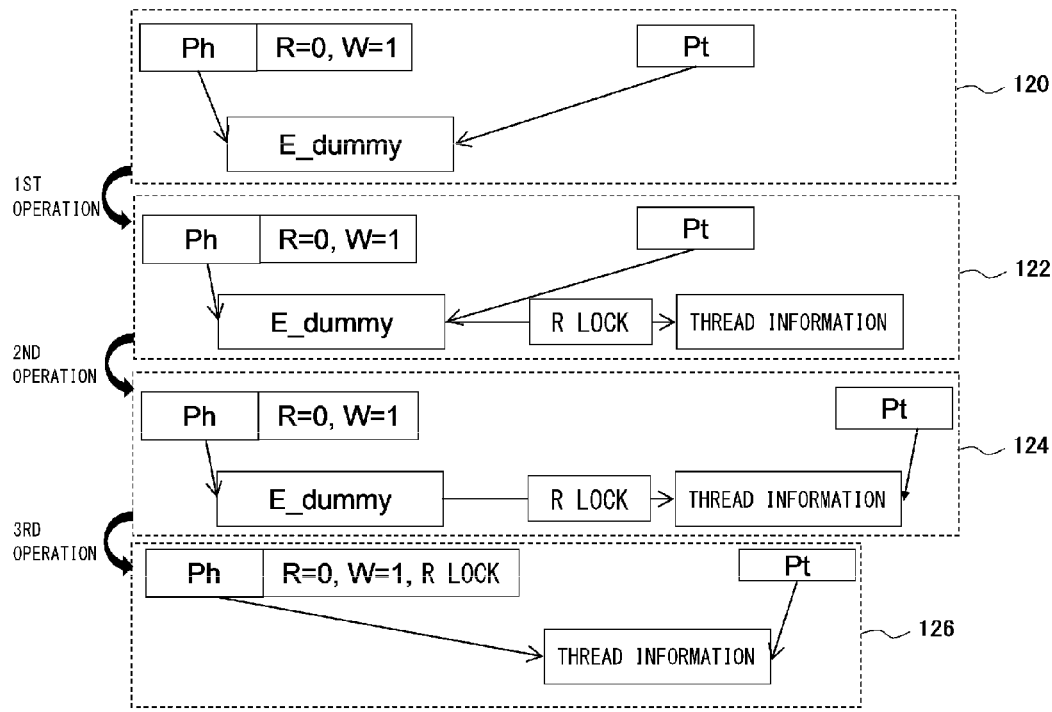
FIG. 17 illustrates how a linked list is operated, according to an embodiment, when there occurs a thread requesting an R lock in a period during which a W lock is acquired by another thread.

FIG. 17 illustrates how a linked list is operated when there occurs a thread requesting an R lock in a period during which a W lock is acquired by another thread. For ease of understanding, FIG. 17 shows a specific example of information on an RW lock. In the first state 102, the RW lock information appended to the head pointer Ph is "R=0 and W=1", which means that another thread has acquired the W lock. As the thread requesting an R lock first references the RW information appended to the head pointer Ph and thereby confirms that the W lock has been acquired by another thread, the thread pushes its own thread information into the queue storage.

At this time, the thread information is first stored in an empty storage area. Then the identification information indicating the type of lock requested by the thread, namely "R lock" in FIG. 17, is appended to a pointer indicating the address of said storage area and the pointer is associated with the dummy element E_dummy. As a result, the state 120 transits to a state 122 (first operation). Then the tail pointer Pt is updated such that the tail pointer Pt indicates the address of the thread information. As a result, the state 122 transits to a state 124 (second operation). Then the head pointer Ph is updated to the value of a pointer associated with the dummy element E_dummy. As a result, the state transits to a state where the head pointer Ph indicates the address of the thread information.

Simultaneously, the identification information ("R lock"), indicating the type of lock requested by the waiting thread, which is appended to the pointer associated with the dummy element E_dummy, is added to additional information of the head pointer Ph. The above-described third operation causes the state 124 to transit to a state 126. As a result, both the information indicating the state of the current lock and the type of lock requested by the thread indicated by the head pointer Ph are appended to the head pointer Ph.

If still another thread requests an R lock or W lock in the state 126, its thread information will be pushed and the type of lock requested by the still another thread will be appended to the pointer indicating the added thread information. As described before, the first operation, the second operation and the third operation are performed in an atomic manner, respectively. Accordingly, similarly to previously explanation concerning the semaphore, the RW lock information appended to each pointer must be set such that the data size of the RW lock information together with the pointer itself is within the size in which an atomic operation is possible. Though FIG. 17 shows the case where the W lock is first acquired, an operation similar to the above-described operation applies to a case where the W lock is requested while the R lock has first been acquired.

Figure 18:
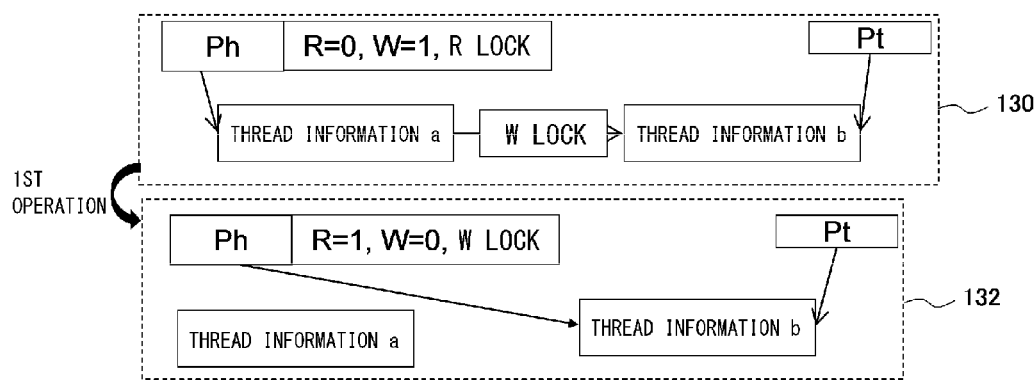
FIG. 18 illustrates how a linked list is operated, according to an embodiment, when a thread having acquired a W lock releases the W lock.

FIG. 18 illustrates how a linked list is operated when a thread that has acquired a W lock releases the W lock. In a state 130 shown in FIG. 18, a thread requesting an R lock and a thread requesting a W lock form a waiting queue in this order, and their respective thread information, namely thread information a and thread information b, are stored in queue storage in this order. The thread, which releases now the W lock, first references the RW lock information appended to the head pointer Ph, thereby finds out that this RW lock information contains the type of lock requested and therefore determines that there is a thread waiting to acquire a lock.

Then the first thread information a is popped out of the waiting queue in the linked list. At this time, the head pointer Ph is updated to the value of a pointer associated with the thread information a popped and, at the same time, the RW lock information appended to the head pointer Ph is updated as well. The W lock is released in the case of FIG. 17. Thus, the variable W is decremented, whereas the variable R is incremented so that the thread associated with the popped thread information a acquires the R lock. Further, since a thread, associated with the subsequent thread information b, makes a request for a W lock, "R lock" in the RW lock information appended to the head pointer Ph is rewritten to (replaced by) "W lock". As a result, the state 130 transits to a state 132.

If, at this stage, a thread associated with the subsequent thread information b is requesting an R lock, the R lock can be continuously acquired and therefore the thread information b will be popped as well. As described above, the thread that releases its own lock retrieves the first thread information from the waiting queue if there are other threads waiting to acquire locks so that the thread acquire the lock. If the lock acquired by the thread is an R lock, the waiting queue is further checked to see if there are other threads continuously waiting to acquire the R locks. If there are the other threads continuously waiting to acquire the R locks, their thread information will be popped sequentially so as to have them acquire the R locks. By supplying the popped thread information, a process starting the thread processing resumes the processing of a thread that has acquired the lock. When the last thread information placed in the waiting queue is popped off, the dummy element is pushed similarly to FIG. 6.

Note that a thread that releases the W lock may pop the leading thread information a only and may not check the subsequent thread information at all. In such a case, whether or not a lock can be acquired may be checked in a successive or chain-reaction manner. That is, for example, the thread, corresponding to the thread information a, which is one that starts the process, checks the thread information b of the next thread that is now placed in the beginning of the waiting queue. And if the requested lock is an R lock, the thread information b is popped so that the corresponding thread processing is started.

The procedure for requesting the lock is the same as that described in connection with the flowchart of FIG. 15. However, the decision in Step S60 will be a decision on whether the requested lock can be acquired or not, and the information updated in Steps S62 and S66 will be the RW lock information. The procedure for releasing the locks is the same as that described in connection with the flowchart of FIG. 16. However, the decision in Step S74 will a decision on whether the requested lock can be acquired or not, and the information updated in Step S72 will be the RW lock information.

By employing the structure as described above, the function of managing the RW lock and the function of a queue of threads waiting to acquire the locks can be simultaneously achieved. Note that these functions can be simultaneously achieved by an atomic operation on the identical queue. Thus, the processor can be released by immediately setting the threads, which cannot acquire the locks, in the standby state. Also, if the locks becomes available, the processing of thread in the standby state, can be resumed at once. Since these processings are each carried out in a non-blocking manner, the wait time of thread can be reduced in the step of accessing queue storage, the steps of acquiring and releasing the locks, the step of state transition of a thread, and the step of resuming the processing, respectively.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An information processing apparatus comprising:
a memory configured to store a data queue comprised of individual data, wherein the data queue comprises a head position and a tail position; and
at least one processor configured to process a data generation thread and a plurality of data consumption threads, the data generation thread placing generated data into the data queue by performing the steps of:
determining what type of data is located at an element identified by the head position of the data queue;
if the head position data contains thread identification relating to one of the plurality of data consumption threads, remove the head position element from the data queue and directly assign the generated data to the data consumption thread associated with the thread identification information for processing the generated data;
if the head position data does not contain thread identification of any of the plurality of data consumption threads, pushing the generated data at the tail position of the data queue by the data generation thread;
a data consumption thread of the plurality of data consumption threads, processing data of the data queue, by performing the steps of:
checking the data located at the head position of the data queue to determine whether the data queue is empty, wherein the data queue is empty if the data at the element in the head position stores thread identification data;
based on the checking, if the data queue is not empty, remove and process the data from the data queue by the data consumption thread;
based on the checking, if the data queue is empty: insert into the data queue an element containing the thread identification of the data consumption thread at the tail position of the data queue; and
suspend the data consumption thread to allow for further processing of the processor.

2. An information processing apparatus according to claim 1, wherein, when the identification information of the data consumption thread exists in the data queue during processing of the data generation thread, the processor changes a state of the data consumption thread which has been suspended to a state to be resumed.

3. An information processing apparatus according to claim 1, wherein an operation of placing the data into the data queue during processing of the data generation thread and an operation of retrieving the data from the data queue during processing of the data consumption thread are performed in stages in units of predetermined atomic operations, and during a period of time other than a period of atomic operation, an operation on the data queue for processing another thread is not inhibited even though the operation of placing data into the data queue or the operation of retrieving the data from the data queue is incomplete.

4. An information processing apparatus according to claim 3, wherein, when, during processing of another thread, the operation on the data queue for processing of the other thread is disabled even during the period of time other than the period of atomic operation, the processor determines that the operation of placing data into the data queue or the operation of retrieving the data from the data queue is incomplete, and wherein the processor performs a predetermined operation according to the incomplete state, so as to partially progress at least either of the operation of placing data into data queue or the operation of retrieving the data from the data queue.

5. An information processing apparatus according to claim 3, wherein the data queue is structured by a linked list such that each unit of data is connected by a pointer indicating subsequent data in the data queue, and the operation of placing the data into the data queue and the operation of retrieving the data from the data queue are performed in stages by updating each pointer atomically.

6. An information processing apparatus according to claim 1, wherein the data queue is structured by a linked list such that each unit of data is connected by a pointer indicating subsequent data in the data queue, wherein dummy data is placed in the data queue in a state where neither of the data to be retrieved and the identification information of the data consumption thread are placed therein, and wherein information by which the dummy data is identified is appended to a pointer indicating the dummy data in the linked list.

7. An information processing apparatus according to claim 1, wherein the data queue is structured by a linked list such that each data is connected by a pointer indicating subsequent data in the data queue, wherein, when placing the identification information of the data consumption thread into the data queue during processing of the data consumption thread, the processor appends information, indicating that the identification information thereof has been placed into the data queue, to a pointer indicating the identity information thereof in the linked list, and wherein, during processing of the data generation thread, the processor determines, by referencing the pointer in the linked list, whether or not the identification information of the data consumption thread is placed into the data queue.

8. An information processing method comprising:
processing a data queue, by a processor, accessed by a data generation thread and a plurality of data consumption threads wherein the data queue comprises a head position and a tail position;
placing, by the data generation thread, generated data into the data queue by performing the steps of:
determining what type of data is located at an element identified by the head position of the data queue;
if the head position data contains thread identification relating to one of the plurality of data consumption threads, remove the head position element from the data queue and directly assign the generated data to the data consumption thread associated with the thread identification information for processing the generated data;
if the head position data does not contain thread identification of any of the plurality of data consumption threads, pushing the data at the tail position of the data queue by the data generation thread;
processing data of the data queue, by a data consumption thread of the plurality of data consumption threads, by performing the steps of:
checking the data located at the head position of the data queue to determine whether the data queue is empty, wherein the data queue is empty if the data at the element in the head position stores thread identification data;
based on the checking, if the data queue is not empty, remove and process the data from the data queue by the data consumption thread;

based on the checking if the data queue is empty: insert into the data queue an element containing the thread identification of the data consumption thread at the tail position of the data queue; and suspend the data consumption thread to allow for further processing of the processor.

9. A non-transitory computer-readable medium in which a program is embedded, the program is executed by a processor and comprises:

a data queue comprised of individual data, wherein the data queue comprises a head position and a tail position;

the data generation thread placing generated data into the data queue by performing the steps of:

determining what type of data is located at an element identified by the head position of the data queue;

if the head position data contains thread identification relating to one of the plurality of data consumption threads, remove the head position element from the data queue and directly assign the generated data to the data consumption thread associated with the thread identification information for processing the generated data;

if the head position data does not contain thread identification of any of the plurality of data consumption threads, pushing the data at the tail position of the data queue by the data generation thread;

a plurality of data consumption thread of the plurality of data consumption threads, processing data of the data queue, by performing the steps of:

checking the data located at the head position of the data queue to determine whether the data queue is empty, wherein the data queue is empty if the data at the element in the head position stores thread identification data;

based on the checking, if the data queue is not empty, remove and process the data from the data queue by the data consumption thread;

based on the checking if the data queue is empty: insert into the data queue an element containing the thread identification of the data consumption thread at the tail position of the data queue; and suspend the data consumption thread to allow for further processing of the processor.

10. An information processing apparatus comprising:

a queue of empty packets indicating information on an unused storage area that stores a predetermined unit of data to be placed into a linked list, the linked list comprising a head position and a tail position;

at least one processor processing a data generation thread and a plurality of data consumption threads; the processor, during processing of the data generation thread for performing the steps of:

attempting to retrieve an empty packet from the queue of empty packets;

remove an empty packet from the queue of empty packets and place data into the empty packet thereby establishing generated data;

determining what type of data is located at an element identified by the head position of the linked list;

if the head position data contains thread identification relating to one of the plurality of data consumption threads, remove the head position element from the linked list and directly assign the generated data to the data consumption thread associated with the thread identification information for processing the generated data;

if the head position data does not contain thread identification of any of the plurality of data consumption threads, pushing the generated data at the tail position of the linked list by the data generation thread;

a data consumption thread, of the plurality of data consumption threads, processing data of the linked list by performing the steps of:

checking the data located at the head position of the linked list to determine whether the linked list is empty, wherein the linked list is empty if the data at the element in the head position stores thread identification data;

based on the checking, if the linked list is not empty, remove and process the data from the linked list by the data consumption thread;

based on the checking if the linked list is empty: insert into the linked list an element containing the thread identification of the data consumption thread at the tail position of the linked list; and suspend the data consumption thread to allow for further processing of the processor.

11. An information processing apparatus according to claim 10, wherein the memory includes a queue of packets comprised of empty packets indicating information on an unused storage area capable of storing a predetermined unit of data to be placed into the data queue, wherein, during processing of data generation thread, the processor attempts to retrieve an empty packet from the queue of packets before the predetermined unit of data generated is placed into the data queue, wherein, when there is no empty packet to be retrieved, the processor places the identification information of the data generation thread into the queue of packets, and wherein, when, during processing of the data consumption thread, an empty packet, which is no longer needed, is returned to the queue of packets after a predetermined unit of data is retrieved from the data queue and when the identification information of the data generation thread is placed in the queue of packets, the processor changes the storage location of the empty packet such that the data generation thread acquires the empty packet.

12. An information processing apparatus according to claim 10, wherein the indication of whether the linked list comprises thread identification is indicated in a head pointer in the linked list, wherein, when the identification information of a thread requesting access is retrieved from the linked list, the thread updates the head pointer in such a manner that the head pointer indicates identification information of a subsequent thread, and wherein the thread updates the head pointer based on the information concerning access requested by the subsequent thread.

13. An information processing apparatus according to claim 10, wherein an operation of placing the identification information of the thread into the linked list and an operation of retrieving the identification information thereof from the linked list are performed in stages in units of predetermined atomic operations, and wherein, during a period of time other than a period of atomic operation, an operation of another thread is not inhibited even though the operation of placing the identity information thereof into the linked list or the operation of retrieving the identity information thereof from the linked list is incomplete.

14. An information processing apparatus according to claim 12, wherein, when the operation on the linked list of the thread is disabled even during the period of time other than the period of atomic operation, the another thread determines that the operation of placing the identification information thereof into the linked list or the operation of retrieving the identification information thereof from the linked list is incomplete, and wherein the another thread performs a predetermined operation according to the incomplete state, so as to partially progress at least either of the operation of placing the identification information thereof into the linked list or the operation of retrieving the identification information thereof from the linked list.

15. An information processing apparatus according to claim 10, wherein the operation of placing the identification information of the thread into the linked list and the operation of retrieving the identification information thereof from the linked list are performed in stages by updating each pointer atomically.

16. An information processing method comprising:
    storing, in memory, a queue of empty packets indicating information on an unused storage area that stores a predetermined unit of data to be placed into a linked list, wherein the linked list comprises a head position and a tail position;
    processing, by at least one processor, a data generation thread and a plurality of data consumption threads, the processing, during the processing of the data generation thread, performing the steps of:
        attempting to retrieve an empty packet from the queue of empty packets;
        removing an empty packet from the queue of empty packets and place data into the empty packet thereby generating data;
        determining what type of data is located at an element identified by the head position of the linked list;
        if the head position data contains thread identification relating to one of the plurality of data consumption threads, remove the head position element from the linked list and directly assign the generated data to the data consumption thread associated with the thread identification information for processing the generated data;
        if the head position data does not contain thread identification of any of the plurality of data consumption threads, pushing the generated data at the tail position of the linked list by the data generation thread;
    processing data of the linked list by a data consumption thread of the plurality of data consumption threads by performing the steps of:
        checking the data located at the head position of the linked list to determine whether the linked list is empty, wherein the linked list is empty if the data at the element in the head position stores thread identification data;
        based on the checking, if the linked list is not empty, remove and process the data from the linked list by the data consumption thread;
        based on the checking if the linked list is empty: insert into the linked list an element containing the thread identification of the data consumption thread at the tail position of the linked list: and
        suspend the data consumption thread to allow for further processing of the processor.

17. A non-transitory computer-readable medium in which a program is embedded, the program is executed by a processor and comprises:
    a queue of empty packets indicating information on an unused storage area that stores a predetermined unit of data to be placed into a linked list, the linked list comprising a head position and a tail position;
    the processor, during processing of the data generation thread for performing the steps of:
        attempting to retrieve an empty packet from the queue of empty packets;
        remove an empty packet from the queue of empty packets and place data into the empty packet thereby generating data;
        determining what type of data is located at an element identified by the head position of the linked list;
        if the head position data contains thread identification relating to one of the plurality of data consumption threads, remove the head position element from the linked list and directly assign the generated data to the data consumption thread associated with the thread identification information for processing the generated data;
        if the head position data does not contain thread identification of any of the plurality of data consumption threads, pushing the generated data at the tail position of the linked list by the data generation thread;
    a data consumption thread, of the plurality of data consumption threads, processing data of the linked list by performing the steps of:
        checking the data located at the head position of the linked list to determine whether the linked list is empty, wherein the linked list is empty if the data at the element in the head position stores thread identification data;
        based on the checking, if the linked list is not empty, remove and process the data from the linked list by the data consumption thread;
        based on the checking if the linked list is empty, insert into the linked list an element containing the thread identification of the data consumption thread at the tail position of the linked list; and
        suspend the data consumption thread to allow for further processing of the processor.

* * * * *